US006356793B1

(12) United States Patent
Martin

(10) Patent No.: US 6,356,793 B1
(45) Date of Patent: Mar. 12, 2002

(54) SERIAL BUS HUB

(75) Inventor: Randall W. Martin, The Woodlands, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/036,761

(22) Filed: Mar. 9, 1998

Related U.S. Application Data

(63) Continuation of application No. 08/663,804, filed on Jun. 14, 1996, now abandoned.

(51) Int. Cl.$^7$ .............................................. G05B 11/01
(52) U.S. Cl. ......................... 700/19; 700/17; 700/83; 700/8; 700/9; 710/101; 710/126; 361/681; 361/682; 361/683; 361/686
(58) Field of Search ................. 700/1, 17–19, 700/8, 9, 83, 84; 361/681, 682, 683, 686, 725, 685; 710/126, 101, 102, 103, 104, 107

(56) References Cited

U.S. PATENT DOCUMENTS

| | | | | |
|---|---|---|---|---|
| 4,403,303 A | * | 9/1983 | Howes et al. .................. | 700/9 |
| 5,107,401 A | * | 4/1992 | Youn .......................... | 361/393 |
| 5,126,954 A | * | 6/1992 | Morita ........................ | 361/683 |
| D345,969 S | * | 4/1994 | Mcknight et al. .......... | D14/114 |
| 5,313,596 A | * | 5/1994 | Swindler et al. ............ | 710/101 |
| D361,324 S | * | 8/1995 | Rogers ....................... | D14/107 |
| 5,477,415 A | * | 12/1995 | Mitcham et al. ............ | 361/686 |
| D368,706 S | * | 4/1996 | Mieki ......................... | D14/114 |
| 5,563,795 A | * | 10/1996 | Futamura et al. ........... | 700/138 |
| 5,587,876 A | * | 12/1996 | O'Brien et al. ............. | 361/682 |
| 5,589,741 A | * | 12/1996 | Terman et al. .............. | 315/360 |
| 5,604,663 A | * | 2/1997 | Shin et al. ................... | 361/686 |
| 5,621,898 A | | 4/1997 | Wooten ...................... | 395/297 |
| 5,708,458 A | * | 1/1998 | Vrbanac ..................... | 345/156 |
| D395,290 S | * | 6/1998 | Nakayama et al. ........ | D14/107 |
| 5,850,340 A | * | 12/1998 | York .......................... | 700/83 |
| 5,935,244 A | * | 8/1999 | Swamy et al. .............. | 713/200 |
| D416,007 S | * | 11/1999 | Cavello ..................... | D14/114 |
| 5,831,823 A | * | 11/1999 | Hoedl ........................ | 361/686 |

FOREIGN PATENT DOCUMENTS

| EP | 407068 A2 | * | 6/1990 |
| EP | 448053 A2 | * | 3/1991 |
| WO | WO 9400037 | * | 1/1994 |

* cited by examiner

*Primary Examiner*—William Grant
*Assistant Examiner*—Ramesh Patel
(74) *Attorney, Agent, or Firm*—Sharp, Comfort & Merrett, P.C.

(57) ABSTRACT

The present invention relates to a monitor base that comprises a serial bus hub having a plurality of ports connected to the hub for interface with a plurality of peripheral devices. With the ports located on the monitor base hub, a computer system's peripheral devices, i.e., keyboard, mouse, printer, scanner, video camera, etc., are connected to the monitor base hub instead of on the rear of the central processing unit.

20 Claims, 3 Drawing Sheets

SERIAL BUS HUB

This application is a continuation of application Ser. No. 08/663,804, filed Jun. 14, 1996 now abandoned.

BACKGROUND OF THE INVENTION

1. Technical Field of the Invention

The present invention relates t o a centralized distribution of a serial data bus for a plurality of peripheral devices. In particular, the present invention relates to a monitor base that comprises a serial bus hub having a plurality of ports.

2. Description of Related Art

Peripheral device s designed to operate with home and office computer systems are typically connected on the rear of the computer system's central processing unit (CPU). The CPU in turn provides the appropriate interface and control for these peripheral devices through individualized connections. With the proliferation of peripheral devices designed to operate with a computer system, an entanglement of cables can easily form when a number of peripheral devices are connected to the CPU. This entanglement of cables presents a drawback because it gives rise to the general difficulty of determining which cable connection on the rear of the CPU supports the corresponding peripheral device. This particular drawback is compounded by the connectors being closely positioned to each other on the rear of the CPU.

The variety of peripheral devices that contribute to an entanglement of cables and wires around a personal computer include the computer keyboard, mouse, speakers, microphones, video cameras, joy sticks, telephones, scanners, etc. The current method for connecting these peripheral devices is on the rear of the CPU. Even if the connecting wires are kept organized, they still tend to be annoying and unsightly to the user. Furthermore, there is limited spacing at the rear of the CPU for the many peripheral connections.

This leads to another deficiency in terms of accessibility to the connectors located on the rear of the CPU. The connector locations on the rear of the CPU do not always provide for easy access and installation of the cables connected to a peripheral device. It is common for an installer to have to reach behind the CPU in order to make a desired connection, which is sometimes performed in an awkward orientation. Due to the placement, orientation and weight of the CPU, it is not always a simple matter of moving the CPU to expose the peripheral connectors.

Another shortcoming that results from connecting peripheral devices directly to the CPU is the added necessity of requiring close proximity of the CPU to the workspace since peripheral devices come with a limited amount of interface cabling. In other words, the peripheral devices cannot be used a large distance from the CPU. However, if the peripheral devices could operate without having to connect directly to the CPU, then the CPU could be remotely located. Remotely locating the CPU frees up workspace for the user by allowing the CPU to be relocated to another area away from the user.

In summary, connecting peripheral devices directly on the rear of a CPU presents drawbacks. First, is the unsightliness of the resulting cables converging to a limited space on the rear of the CPU. Second, connector accessibility does not always provide for easy access and installation of the peripheral devices on the rear of the CPU. And third, the CPU must be in close proximity to the workspace since the peripheral devices come with a limited amount of cabling.

Hence, there is a need to provide a centralized distribution of a serialized data bus for a plurality of peripheral devices. With a centralized distribution hub for a serial bus, a computer system's peripheral devices, i.e., keyboard, mouse, printer, scanner, joy stick, video camera, etc., are connected to the serial bus hub instead of on the rear of the central processing unit. This capability would overcome the drawbacks and shortcomings of connecting the peripheral devices on the rear of the CPU.

SUMMARY OF THE INVENTION

The present invention relates to a monitor base that comprises a serial bus hub and a plurality of ports connected to the hub for interface with a plurality of peripheral devices.

In accordance with another aspect of the invention, the present invention relates to a support structure provided for a monitor comprising a serial bus hub and a plurality of ports connected to the hub for interface with a plurality of peripheral devices.

A further aspect of the invention is a serial bus hub comprising a monitor base wherein the monitor base comprises a plurality of ports for interface with a plurality of peripheral devices.

In accordance with another aspect of the invention, the present invention relates to a computer system comprising a central processing unit and a monitor having a base, wherein the base comprises a serial bus hub and a plurality of ports connected to the hub for interfacing with a plurality of peripheral devices.

Still a further aspect of the invention is a method of interfacing a plurality of peripheral devices from a serial bus hub, comprising the steps of interfacing with a serial bus and distributing a plurality of ports connected to the serial bus within the hub.

Still further aspects of the present invention will become readily apparent to those skilled in the art from the following detailed description wherein exemplary embodiments of the invention are discussed. As will be realized, the invention is capable of modifications in various obvious aspects without departing from the invention. The drawings and description are to be regarded as illustrative in nature, and not as restrictive.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF PRESENTLY PREFERRED EXEMPLARY EMBODIMENTS

Figure 1:
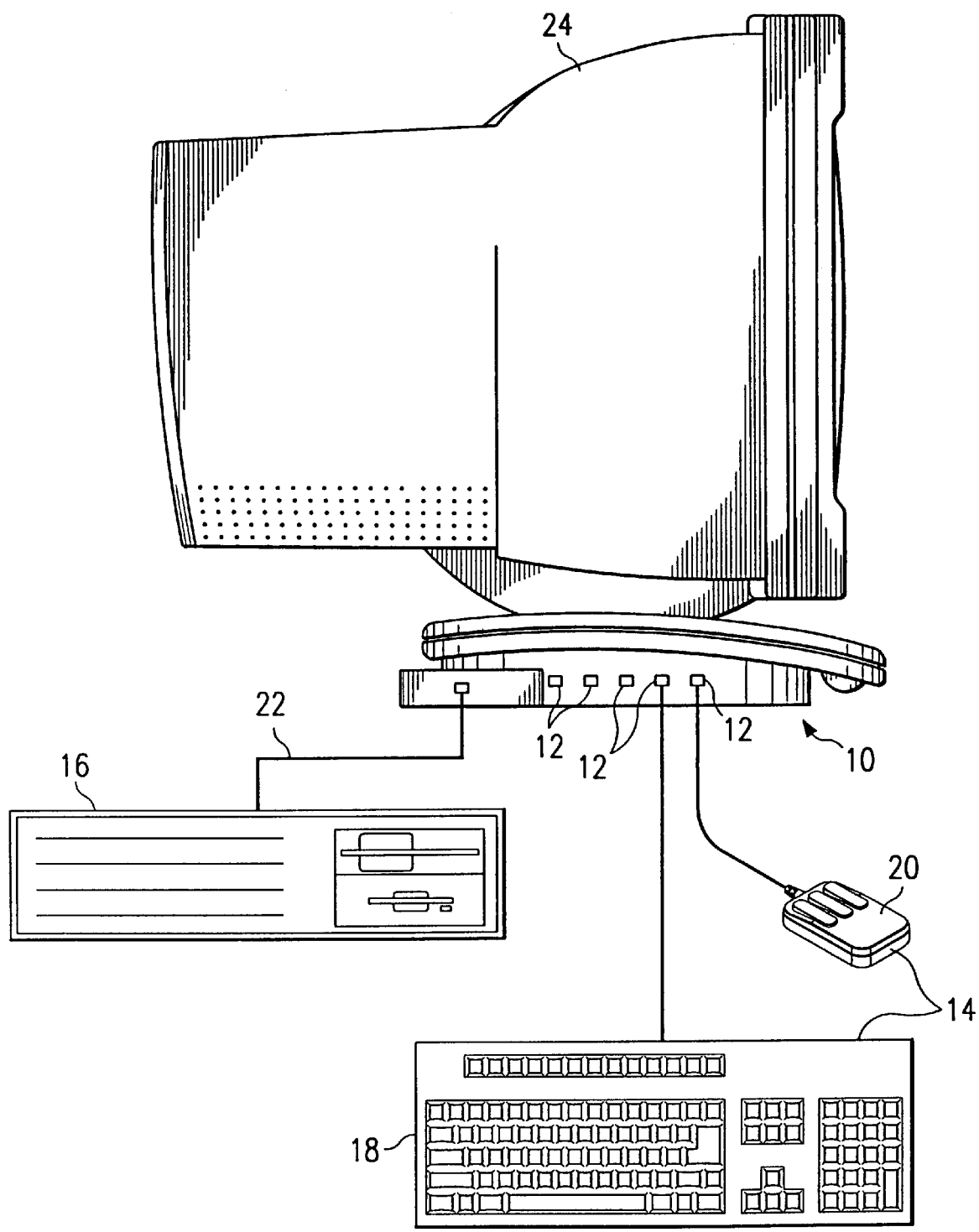
FIG. 1 depicts an exemplary embodiment of a monitor base which serves as a serial bus hub for a plurality of peripheral devices.

Referring to FIG. 1, an exemplary embodiment of a monitor base which serves as a serial bus hub 10 is depicted.

The monitor base serial bus hub 10 has a plurality of ports 12 to provide a means for connecting a plurality of peripheral devices 14. Connection is made directly to the monitor base hub 10 instead of on the rear of a central processing unit (CPU) 16.

As shown, a keyboard 18 and a mouse 20 are representative of the types of peripheral devices 14 that can be connected to the monitor base hub 10. Other peripheral devices 14 which can communicate via the monitor base hub 10 to the CPU over a single serial bus 22 may be connected to the monitor base hub 10 via the plurality of ports 12. These other types of peripheral devices are discussed in more detail below.

Although the monitor base hub 10 could be a variety of shapes and sizes, the preferred monitor base hub 10 has a substantially flat upper surface and an adapter means (not shown) to connect to and support a monitor 24. In fact, the monitor base hub 10 can be designed to support a variety of different monitors 24. Such as monitors of different sizes, weights and resolutions.

The monitor base serial bus hub 10 connects to the CPU 16 via a single bidirectional serial bus 22. The preferred protocol for the serial bus 22 is the Universal Serial Bus (USB) standard. However, other types of serial bus formats are acceptable. For example, the RS-232 and RS-485 serial bus standards could also be acceptable.

The peripheral devices 18, 20 are connected to the monitor base hub 10 and are compatible with the selected serial bus standard. For example, if the USB is the implemented serial bus standard, then USB compatible peripheral devices may be connected to the monitor base hub 10 via the ports 12.

Figure 2:
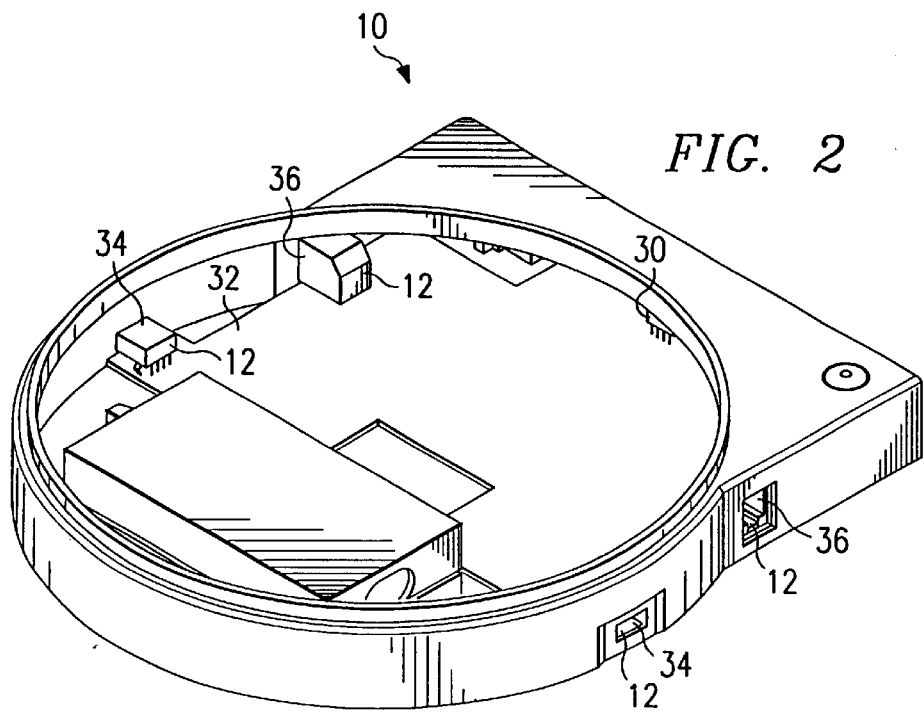
FIG. 2 depicts an exposed view of the preferred exemplary embodiment of the monitor base hub.

FIG. 2 depicts an exposed view of the preferred exemplary embodiment of the monitor base hub 10. The upper section of the monitor base hub 10 has been removed to expose the plurality of ports 12. Connection of the serial bus 22 to the monitor base hub 10 is made via the serial bus input connection means 30 located on the rear of the monitor base hub 10. The possible connection means for a serial data bus 22 are well known in the art. Connection of the serial bus 22 with the plurality of ports 12 housed within the monitor base hub 10 is performed by a circuit card 32 designed for distributing the serial bus 22 to the plurality of ports 12. Implementation of the circuit card 32 for distribution of a serial bus input connection means 30 to a plurality of ports 12 is known to someone of ordinary skill in the art.

Referring to both FIGS. 1 and 2, the exemplary embodiment illustrates two serial bus output connection means 34. A serial bus output connection means 34 is positioned on the left side and the right side of the monitor base hub 10. The types of peripheral devices, for example, that would connect to a serial bus output port 34 include, but are not limited to the following: a keyboard 18, a mouse 20, a printer, a scanner, a camera, a joy stick, etc. Once connected to the monitor base hub 10, control of these peripheral devices 14 is over the serial data bus 22. The serial data bus 22 provides the interface between the CPU 16 and the monitor base hub 10.

The serial bus output connection means 34 includes supporting peripheral devices that communicate with the serial bus hub 10 over a wireless connection. This connection includes, but is not limited to, communications via infrared, acoustical and visual spectrums.

A telephone plug connection means 36 is located in close proximity to each of the serial bus output connection means 34. The telephone plug connection means 36 permits connection to a telephone line in order to support peripheral devices that require such a connection.

Figure 3:
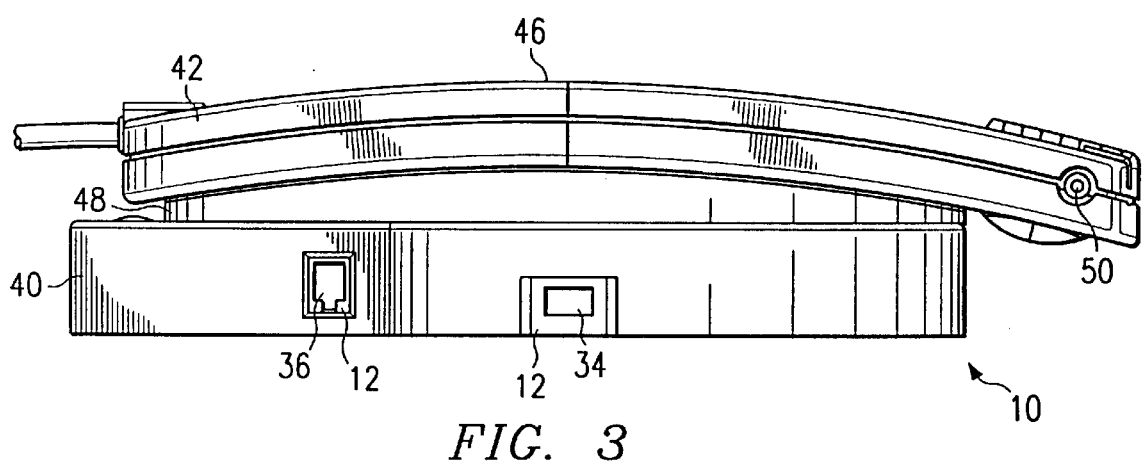
FIG. 3 depicts the left side view of the exemplary embodiment of the monitor base hub.

FIG. 3 depicts the left side view of the exemplary embodiment of the monitor base hub 10. The monitor base hub 10 further comprises a lower portion 40 adapted to rest on a generally horizontal surface and an upper portion 42 having a substantially flat surface and an adapter means 46 to connect to and support a monitor, and a means for attaching 48 the upper portion 42 to the lower portion 44. The means for attaching the upper portion 42 to the lower portion 40 comprises a rotatable connection such that the upper portion 42 can be axially rotated while the lower portion 40 remains stationary.

The two ports 12 located on the left side of the monitor base hub 10 are a serial bus output port connection means 34 and a telephone plug connection means 36. These two ports 12 can be symmetrical with the two ports 12 located on the opposite side of the monitor base hub 10. The ports 12 in the exemplary embodiment of the monitor base hub 10 are preferably located on the lower portion 40 of the monitor base hub 10. This permits the upper portion 42 to be rotated without moving the cables connected to peripheral devices 14. When the upper portion of the monitor base hub 10 is supporting a monitor 24, movement of only the upper portion 42 allows optimum positioning of the monitor 24 without interfering with the cabling supporting the peripheral devices 14.

A headphone jack 50 is provided for the sound system included within the monitor base hub 10. Features of the sound system will be discussed in more detail when reference is made to FIG. 5.

Figure 4:
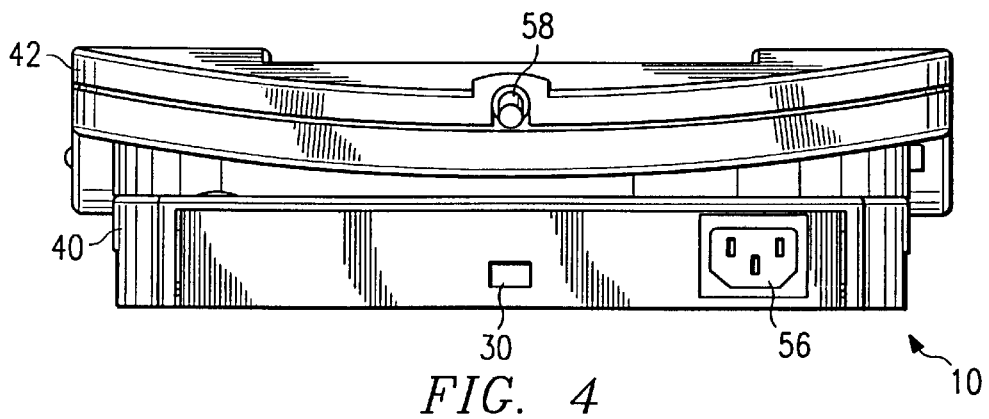
FIG. 4 depicts the rear view of the exemplary embodiment of the monitor base hub.

FIG. 4 depicts the rear view of the exemplary embodiment of the monitor base hub 10. An input power connector 56 is provided on the monitor base hub 10. The power received by the input power connector 56 can pass through the monitor base hub 10 to the monitor 24 by way of the power cable 58 extending from the upper portion 42 of the monitor base hub 10. The end of the power cable 58 is a plug corresponding to the appropriate power receptacle located on the monitor 24.

When the monitor base hub 10 is supporting a monitor 24, the power cable 58 from the upper portion 42 of the monitor base hub 10 connects to the power receptacle on the monitor 24 to provide power. A benefit of placing the power cable 58 on the upper portion 42 of the monitor base hub 10 allows the power cable 58 to rotate with rotation of the upper portion 42 of the monitor base hub 10 without placing tension on or possibly binding the power cable 58.

The input serial bus connection 30 is again shown as being positioned on the lower portion 40 of the monitor base hub 10. Connection of the monitor base hub 10 to the serial bus 22 is made via the input serial bus connection means 30.

Figure 5:
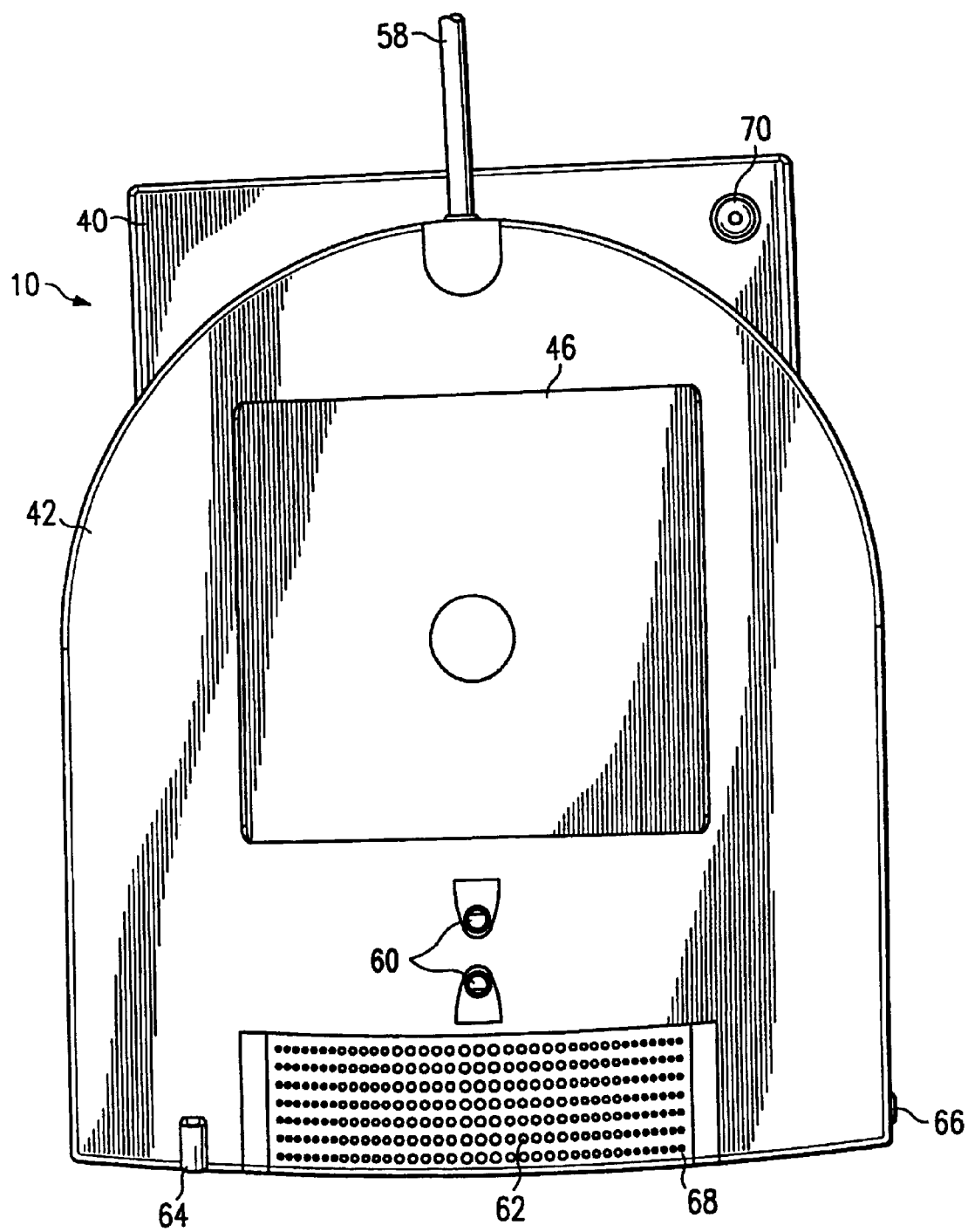
FIG. 5 depicts the top view of the exemplary embodiment of the monitor base hub without a monitor resting on top.

FIG. 5 depicts the top view of the exemplary embodiment of the monitor base hub 10 without a monitor 24 resting on top. The upper portion 42 of the monitor base hub 10 contains a sound system for transmitting and receiving audio over the serial bus 22.

Included in the sound system is a microphone 60, a speaker 62, a mute control 64 and a volume control 66. A headphone jack 50 is also provided as part of the sound system, as shown in FIG. 3. The preferred location of the sound system components is on the upper portion 42 of the monitor base hub 10 so that these components are oriented toward the user while viewing the monitor 24.

This particular exemplary embodiment of the sound system utilizes a microphone 60 to support audio for transmission over the serial bus 22. Received audio from the serial data bus 22 is communicated through the speaker 62 located behind the speaker grill 68. The audio may also be received through headphones plugged into the headphone jack 50. A volume control 66 and a mute control 64 may also be implemented on the monitor base hub 10 to support the sound system.

A power button 70 turns on and off the power passing through the monitor base hub 10. The power cable 58 extending from the upper portion 42 of the monitor base hub 10 is used to pass power through the monitor base hub 10 in order to power the monitor 24.

An adapter means 46 has a substantially flat surface to connect to and support a monitor 24. The adapter means 46 is sized and configured according to the type of monitor(s) 24 to be supported. For instance, a monitor's size, weight, center of gravity, etc. are taken into consideration when the adapter means 46 is designed to support a particular type monitor 24.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A monitor base for supporting a monitor in a location spaced apart from a computer chassis, comprising:
   a lower portion including a bus hub mounting a first serial bus port connectable by a bus connection link to a CPU located in said spaced apart computer chassis;
   said bus hub also mounting a plurality of communication ports electrically connected to said first serial bus port, each said communication port permitting coupling to a peripheral device to enable communication through said first serial bus port between said peripheral device and said CPU when connected by a bus connection link to said first serial bus connector; and
   an upper portion providing a monitor support, said upper portion attached to said lower portion to permit rotary movement of said upper portion relative to said lower portion.

2. The monitor base of claim 1, wherein said first serial bus port is a Universal Serial Bus (USB) port.

3. The monitor base of claim 1, wherein said plurality of ports comprise at least one serial bus connection for connecting a peripheral device.

4. The monitor base of claim 3, wherein said serial bus connection comprises a wireless transmitter and receiver operational in at least one of a radio frequency, a light, and an acoustic spectrum.

5. The monitor base of claim 1, wherein at least one of said plurality of communication ports comprises a telephone line interface.

6. The monitor base of claim 5, wherein said telephone line interface comprises a telephone jack connector.

7. The monitor base of claim 1, further comprising a sound system connected to receive audio signals from said serial bus.

8. The monitor base of claim 7, wherein said sound system comprises a means for interface with at least one microphone.

9. The monitor base of claim 7, wherein said sound system is adapted to transmit audio signals to and from said serial bus port, said sound system including at least a microphone and a loudspeaker.

10. The monitor base of claim 1, wherein said bus hub further comprises an electrical power supply connector.

11. The monitor base of claim 10, wherein said bus hub further comprises a power cable connected to said electrical power supply connector, said power cable extending from said upper portion of the monitor base.

12. A computer system comprising:
   a central processing unit chassis; and
   a remotely located monitor support comprising:
      a bus hub including a serial bus port connected, via a bus cable, to said central processing unit chassis, said serial bus port also connected to a plurality of communication ports in said monitor support, said communication ports adapted to connect to peripheral devices to enable communication through said serial bus port between a peripheral device connected to a said communication port and said central processing unit; and
      an upper portion providing a surface on which a monitor can be positioned and a lower portion attached to said upper portion to permit rotation of said upper portion with respect to said lower portion, said lower portion incorporating said bus hub.

13. The computer system of claim 12, wherein said communication ports include at least one universal serial bus port.

14. The computer system of claim 12, wherein at least one of said communication ports comprises a telephone port.

15. The computer system of claim 12, wherein said serial bus hub port comprises a universal serial bus port.

16. A monitor base for supporting the weight of a monitor, said monitor base comprising:
   a bus hub including a first serial bus port adapted to be electrically connected by a bus communication link to a CPU located in a computer chassis structurally separate from and remotely located from said monitor base;
   said bus hub accommodating a plurality of communication ports each electrically connected to said first serial bus port for interfacing with respective peripheral devices to enable communication between a peripheral device connected to a said communication port and said CPU over said bus communication link; and
   superposed upper and lower portions, said lower portion accommodating said bus hub and said communication ports, said upper portion rotatably attached to said lower portion and providing a support on which a monitor can be positioned and releasably attached.

17. The monitor base of claim 16, wherein said base portion also accommodates at least one electrical power supply connector.

18. The monitor base of claim 16, wherein said lower portion includes a sound system for audio signal transmission to and reception from said first serial bus port.

19. The monitor support of claim 16, wherein said lower portion accommodates a sound system including at least a microphone and a loudspeaker for audio signal transmission to and reception from said first serial bus port.

20. A monitor base for supporting the weight of a monitor, said monitor base comprising:
   a bus hub including a first serial bus port adapted to be electrically connected by a bus communication link to a CPU located in a computer chassis structurally separate from and remotely located from said monitor base;

said bus hub accommodating a plurality of communication ports each electrically connected to said first serial bus port for interfacing with respective peripheral devices to enable communication between a peripheral device connected to a said communication port and said CPU over said bus communication link, at least one of said communication ports comprising a serial bus port and at least one other of said communication ports comprising a telephone interface port; and superposed upper and lower portions, said lower portion accommodating said bus hub and said communication ports and an electrical power supply input connector connected to a power cable extending from said upper portion, said upper portion rotatably attached to said lower portion and providing a support on which a monitor can be positioned and releasably attached.

* * * * *